(12) United States Patent
Harding et al.

(10) Patent No.: US 7,489,408 B2
(45) Date of Patent: Feb. 10, 2009

(54) OPTICAL EDGE BREAK GAGE

(75) Inventors: Kevin George Harding, Niskayuna, NY (US); Shu-Guo Tang, Bluebell, PA (US); Craig Alan Cantello, Schenectady, NY (US)

(73) Assignee: General Electric Company, Niskayuna, NY (US)

( * ) Notice: Subject to any disclaimer, the term of this patent is extended or adjusted under 35 U.S.C. 154(b) by 371 days.

(21) Appl. No.: 11/274,578

(22) Filed: Nov. 15, 2005

(65) Prior Publication Data

US 2007/0109558 A1 May 17, 2007

(51) Int. Cl.
*G01B 11/30* (2006.01)
(52) U.S. Cl. ....................................... 356/603
(58) Field of Classification Search ............. 356/603
See application file for complete search history.

(56) References Cited

U.S. PATENT DOCUMENTS

| | | | |
|---|---|---|---|
| 4,641,972 A | | 2/1987 | Halioua et al. |
| 4,727,390 A | * | 2/1988 | Brown ................. 396/420 |
| 4,952,772 A | | 8/1990 | Zana |
| 4,983,043 A | | 1/1991 | Harding |
| 4,984,893 A | | 1/1991 | Lange |
| 5,069,548 A | | 12/1991 | Boehnlein |
| 5,189,493 A | | 2/1993 | Harding |
| 5,307,152 A | | 4/1994 | Boehnlein et al. |
| 5,500,737 A | | 3/1996 | Donaldson et al. |
| 5,636,025 A | | 6/1997 | Bieman et al. |
| 5,825,495 A | | 10/1998 | Huber |
| 5,835,218 A | | 11/1998 | Harding |
| 6,009,189 A | | 12/1999 | Schaack |
| 6,040,910 A | | 3/2000 | Wu et al. |
| 6,084,712 A | | 7/2000 | Harding |
| 6,229,913 B1 | | 5/2001 | Nayar et al. |

(Continued)

FOREIGN PATENT DOCUMENTS

EP   1482275   1/2004

(Continued)

OTHER PUBLICATIONS

JP20000097672 Abstract.

(Continued)

*Primary Examiner*—Tarifur Chowdhury
*Assistant Examiner*—Isiaka O Akanbi
(74) *Attorney, Agent, or Firm*—Penny A. Clarke

(57) ABSTRACT

A projector (20) projects a structured light pattern (46) along a first optical axis (44) onto a surface (80). A viewer (50) attached to the projector (20) receives a reflection of the structured light pattern (46) from the surface (80) along a second optical axis (54), and digitizes a two-dimensional snapshot. The optical axes (44, 54) are non-parallel, and they meet within a common field of view of the projector (20) and the viewer (50). A computer (61) interfaced to the viewer (50) receives the digitized snapshot, and analyzes it to mathematically model the surface for display and inspection. The projector and attached viewer are designed as a hand-held unit with a hand grip (66) and a trigger button (68) to trigger a snapshot. A guide tip (70) on the unit extends beside the two optical axes (44, 54) to the common field of view to position the hand-held unit.

6 Claims, 2 Drawing Sheets

U.S. PATENT DOCUMENTS

| | | |
|---|---|---|
| 6,252,623 B1 | 6/2001 | Lu et al. |
| 6,438,272 B1 | 8/2002 | Huang et al. |
| 6,603,103 B1 | 8/2003 | Ulrich et al. |
| 6,636,255 B1 | 10/2003 | Kobayashi et al. |
| 6,639,685 B1 | 10/2003 | Gu et al. |
| 6,788,210 B1 | 9/2004 | Huang et al. |
| 6,825,937 B1 | 11/2004 | Gebauer et al. |
| 6,841,780 B2 | 1/2005 | Cofer et al. |
| 6,873,421 B2 | 3/2005 | Lim et al. |
| 6,910,278 B2 | 6/2005 | Holder |
| 6,912,888 B2 | 7/2005 | Stierle et al. |
| 6,945,124 B1 | 9/2005 | Leboeuf et al. |
| 7,324,677 B2 | 1/2008 | Minor |
| 2002/0012004 A1 | 1/2002 | Derring |

FOREIGN PATENT DOCUMENTS

| | | |
|---|---|---|
| WO | 0169172 | 9/2001 |

OTHER PUBLICATIONS

EP Search Report, EP06255799, Mar. 20, 2007.

Degrieck, J.; Paepegem, W. Van; and Boone, P., "Application of Digital Phase-Shift Shadow Moire to Micro Deformation Measurements of Curved Surfaces", Optics and Lasers in Engineering, 2001, vol. 36, pp. 29-40.

* cited by examiner

OPTICAL EDGE BREAK GAGE

RELATED APPLICATION

The present invention is related to U.S. patent application Ser. No. 11/274,579, titled "Computer-Implemented Techniques And System For Characterizing Geometric Parameters Of An Edge Break In A Machined Part", assigned in common to the same assignee of the present invention, filed concurrently herewith and incorporated by reference in its entirety.

FIELD OF THE INVENTION

This invention is generally related to the field of optical-based measurements, and, more particularly, relates to the use of fringe patterns optically projected onto a surface to obtain three-dimensional (3-D) measurements, as may be used for profiling an edge break in a manufactured part.

BACKGROUND OF THE INVENTION

Machined parts for various applications, such as turbine airfoils, compressor fans, blade roots, etc., may have edges shaped for achieving specified mechanical properties, including avoidance or reduction of stress concentrations. Features and/or geometric discontinuities that could give rise to edge sharpness, such as may be encountered in a chamfer, bevel, fillet and other part features will be referred to in the context of this description as an edge break.

Inspection of edge breaks, either for manufacturing quality control or for determination of part wear, has been time consuming and burdensome. In past practice, edge breaks have been measured using a wax or soft-metal impression of the edge. The impression is then measured using a stylus or a tracer-type of mechanical gage, or is sectioned on planes normal to the line of the edge, and viewed using an optical comparator. This practice is generally time consuming and inexact due to challenges in making an accurate replica of the edge break, and obtaining a correct cross sectional mapping.

Known devices for performing non-contact 3D surface profiling with structured light patterns in general have not been user-friendly for performing fast measurements in a manufacturing setting due to their lack of portability and difficulties associated with the handling of such devices. For example, the weight and size of such devices are generally not conducive to enable service personnel to quickly and accurately inspect multiple parts that may be located in multiple locations of a manufacturing plant floor.

Thus it is desirable to provide an edge break gage not subject to the foregoing shortcomings.

BRIEF DESCRIPTION OF THE DRAWINGS

Aspects of the present invention are described in the following description together with the drawings that are made up of the following figures.

DETAILED DESCRIPTION OF THE INVENTION

Figure 1:
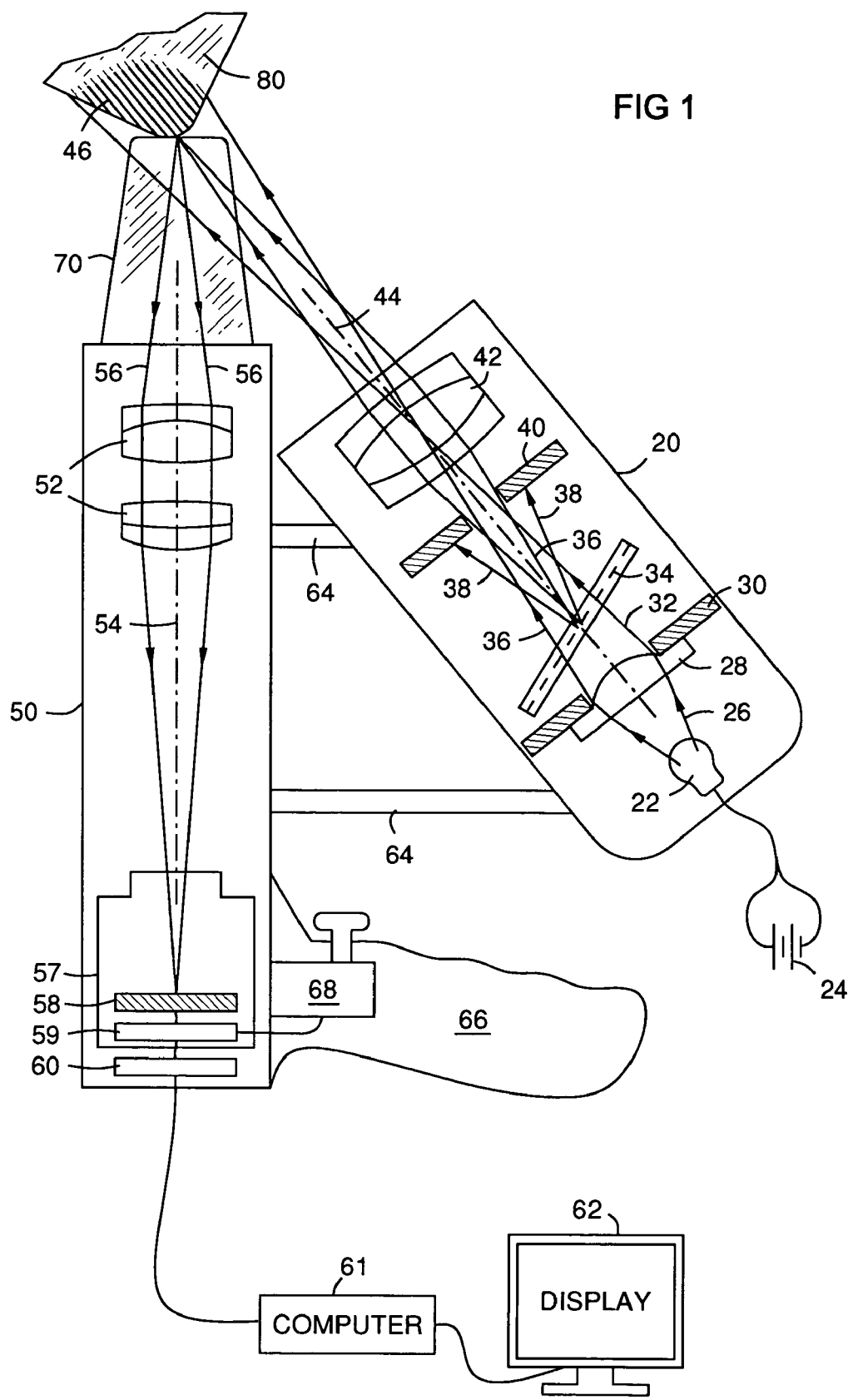
FIG. 1 is a schematic view of a hand-held edge break gage in accordance with an exemplary embodiment of the invention.
Figure 2:
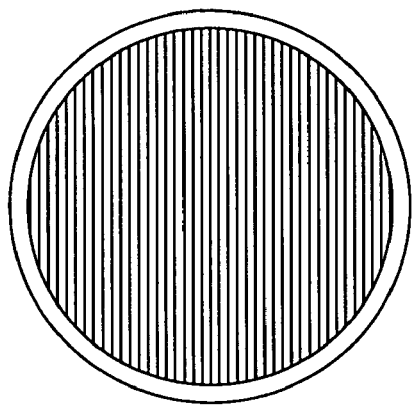
FIG. 2 is a schematic view of an exemplary optical grating of Ronchi lines.
Figure 3:
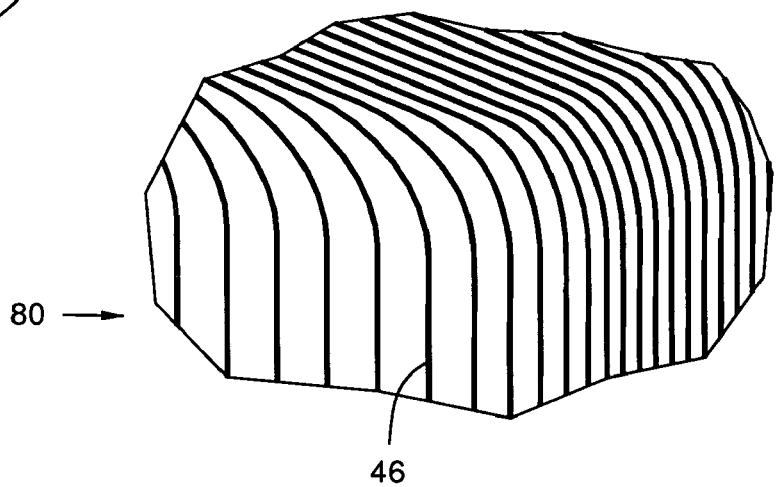
FIG. 3 is a perspective view of a surface reflecting an exemplary structured light pattern.

In accordance with an exemplary embodiment of the present invention, FIG. 1 shows a schematic view of a hand-held projector 20 and attached viewer 50. The projector has a light source 22, such as a light-emitting diode (LED), with a power source 24, such as a battery or a cord connection to an electrical outlet. The projector 20 comprises an optics system that may include a condenser lens 28 with a condenser aperture 30, and an imaging lens 42 with an imaging aperture 40. A grating 34 of alternating opaque and transparent areas is mounted at or near the focal plane of the imaging lens. A Ronchi ruling may be used as illustrated in FIG. 2. The grating 34 projects a structured light pattern 46 onto a surface 80 as illustrated in FIG. 3.

The light source 22 produces diverging rays 26, which are collected and directed by the condensing lens 28 into collected rays 32. These rays pass through the grating 34, which blocks parts of the beam, resulting in a structured light pattern 46. For example, if a Ronchi grating is used, this results in a projection of planar beams. Light intensity varies on a line normal to these beams as a square waveform with a fundamental sinusoidal component 36 and harmonic components 38 that define the sharp changes in intensity in the square wave. The harmonic components 38 are diffracted by the grating to angles that increase with frequency, and can therefore be removed by the imaging aperture 40. This removes extraneous interference patterns that would otherwise appear on the surface 80 due to crossing harmonics. The imaging aperture 40 may comprise for example a slit parallel to the Ronchi lines.

A viewer 50 is attached to the projector 20, and comprises optics 52 with an optical axis 54 that is non-parallel to the projector optical axis 44. A digital camera element 57 in the viewing system 50 may comprise an image sensor 58, such as a charge-coupled device array, an analog-to-digital converter 59, and other electronics as will be known by those skilled in the field of digital cameras. These elements digitize an image of the diffuse reflection 46 of the structured light pattern from the surface 80 as viewed along the viewing light path 54. The camera electronics may be connected to an internal battery and memory for storing data for later processing (not shown), or they may be connected to an external computer 61 by wired or wireless means via an interface circuit 60 such as a universal serial bus interface as known in the field of computer input devices. The computer interface circuit may be included in the camera electronics as is known in the field of digital cameras.

In the illustrated embodiment, one or more hand grips 66 may be attached to any desired area of the projector and/or viewer for hand-held operation. A trigger button 68 may be provided to trigger a snapshot as known in the field of digital cameras. Acquisition of a digital snapshot may take just a few milliseconds, so substantial steadiness over a relatively long period of time is not required. In another embodiment (not shown) the gage assembly may be attached to a robotic arm, for automatic operation as known in the field of robotic assembly and inspection. For handheld operation, a guide tip 70 may extend forward of the viewing system 50 beside or around the light paths 44, 54 to steady and position the break gage unit at a distance from the surface 80 such that the surface is sufficiently proximate the intersection of the optical axes 44, 54 and within a common field of view of the projector and viewer.

The viewer optics 52 may be designed with a field of view optimized for looking around an edge of 90 degrees or more. An example of suitable viewer optical specifications for edge break analysis of a turbine component may be as follows:

Field of view=about 3.5 mm square
Depth of field=2 mm or more with<50% contrast loss
Spatial resolution=0.005 mm or less with<2% distortion
Depth resolution=0.005 mm It will be appreciated by those skilled in the art that either or both the projector and the viewer optics could include a telecentric lens system or other optical system configured to improve the uniformity of the light or image field and/or to improve the optical access to the edge surfaces. As will be appreciated by those in the art, a telecentric lens system makes all views to the surface substantially parallel. In the case of the viewer, this would provide a more uniform collection of light from the two sides of the edge break. An example of an optical system configured to improve the uniformity of the light may include a mirror system arranged to direct the illumination to the two sides of the edge more uniformly.

An edge being profiled may be oriented at an angle that is essentially normal to the viewing system optical axis and away from the specular reflection from the illumination system, so as to view the diffusely reflected light without interference from any specularly reflected light. However, the exact orientation of the angle of view is non-critical to the operation of the device.

As illustrated in FIG. 1 the grating 34 may be positioned at an angle to the projection optical axis 44 to provide a focal plane of the grating image that crosses the surface 80 at an average depth on the area being profiled, taking the above surface orientation into account. The edge being profiled may be preferably oriented such that lines of the light pattern cross the edge, rather than follow it. However, the pattern contours need not be normal to an edge line for satisfactory operation.

Moire interferometry can be used with this system with the addition of a sub-grating (not shown) in the viewing system 50. For readers desirous of background information regarding Moire interferometry, reference is made to U.S. Pat. No. 5,835,218 (K. Harding). The computer 61 may implement various known analysis methods or processing techniques, such as phase shift analysis. As will be appreciated by those skilled in the art, phase shift analysis uses the combination of three or more images of a periodic pattern, each with a small displacement or phase shift of the pattern to calculate the effective phase of the pattern at each point in the image, then further uses this information to calculate the overall shape of the part surface. As will also be appreciated, such phase shift analysis can be performed on a single image by means of a bias fringe pattern that can then be mathematically shifted to perform the same analysis.

Additional exemplary analysis or processing techniques that may be used include Fourier profilometry, a mathematical analysis method for measuring surface profiles using distortions in periodic patterns projected onto a surface. As will be appreciated by those skilled in the art, Fourier profilometry, can be used to mathematically model the surface based on contour information provided by the digitized structured light image. The method uses Fourier analysis with a two-dimensional fast Fourier transform to determine localized slopes on a curving surface. This allows an x, y, z coordinate system of the surface to be generated from a single image that has been overlaid with the distortion pattern.

Additional exemplary analysis or processing techniques that may be used include optical triangulation techniques, also well-understood by those skilled in the art. In general, triangulation is a measuring method in which the distance to an object is calculated based upon angular relationships. Optical triangulation is used to associate distance or range information with each point on a 2D image of a surface being measured, providing the third dimension, or z coordinate. To calculate the distance information, a measure of a change in a structured light pattern projected onto the surface is analyzed relative to the same pattern in some reference state.

Optical triangulation methods use a beam of light striking a surface at some angle to the surface. As the distance to the surface is changed, a given reflected spot of this light will move to a different location on the surface. This effect assumes that the surface is viewed at some angle other than the incident angle of the beam. Projecting a planar beam illuminates a line on the surface instead of a spot, creating a continuous series of illuminated points that trace the surface as though the part has been cut by the planar beam. Thus a planar beam of light will produce a contour of the surface as seen from a viewer's perspective outside the plane of the planar beam.

Regardless of the specific processing technique being used, a generated mathematical model can then produce profiles of surface sections normal to the line of an edge for comparison to part specifications for inspecting manufactured parts.

Figure 4:
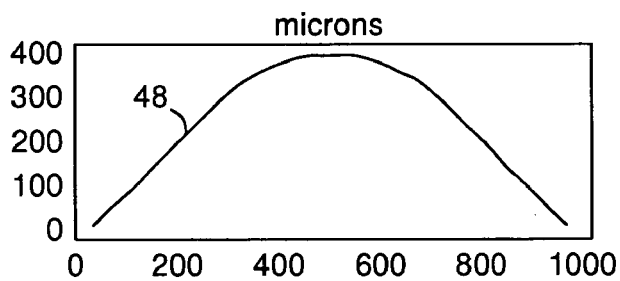
FIG. 4 is a sectional profile display of the surface of FIG. 2 on a plane normal to an edge of the surface.
Figure 5:
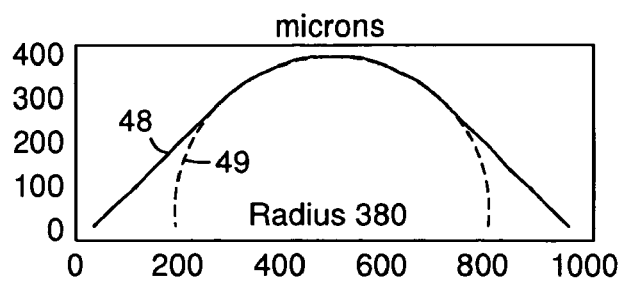
FIG. 5 is a sectional profile display as in FIG. 3 with an edge fillet arc as computed by arc fitting to the edge profile.

A profile along any section of interest can be provided at any angle from the mathematical model as known in the field of 3D computer aided design (CAD) programs. Such profiles can be displayed on a computer display 62 as illustrated in FIGS. 4 and 5, and/or automatically analyzed for conformance to specifications. A radius of curvature 49 can be computed from a modeled fillet profile by known arc fitting formulas, and be displayed as illustrated in FIG. 5, and/or the specified radius of curvature can be displayed textually or graphically on the profile for comparison. An enlarged 3D wire frame view of the modeled surface may be displayed for visual confirmation of generally correct modeling. For readers desirous of background information regarding innovative computer-implemented techniques for quantitatively characterizing in automated fashion one or more geometric parameters of an edge break, reference is made to U.S. patent application Ser. No. 11/274,579.

Aspects of the present invention can also be embodied as computer readable code on a computer readable medium. The computer readable medium may be any data storage device that can store data, which thereafter can be read by a computer system. Examples of computer readable medium include read-only memory, random-access memory, CD-ROMs, DVDs, magnetic tape, optical data storage devices. The computer readable medium can also be distributed over network coupled computer systems so that the computer readable code is stored and executed in a distributed fashion.

Based on the foregoing specification, aspects of the present invention may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the invention. The computer readable media may be, for example, a fixed (hard) drive, diskette, optical disk, magnetic tape, semiconductor memory such as read-only memory (ROM), etc., or any transmitting/receiving medium such as the Internet or other communication network or link. The article of manufacture containing the computer code may be made and/or used by executing the code directly from one medium, by copying the code from one medium to another medium, or by transmitting the code over a network.

An apparatus for making, using or selling the invention may be one or more processing systems including, but not limited to, a central processing unit (CPU), memory, storage devices, communication links and devices, servers, I/O devices, or any sub-components of one or more processing systems, including software, firmware, hardware or any combination or subset thereof, which embody the invention as set forth in the claims.

User input may be received from the keyboard, mouse, pen, voice, touch screen, or any other means by which a human can input data to a computer, including through other programs such as application programs.

One skilled in the art of computer science will easily be able to combine the software created as described with appropriate general purpose or special purpose computer hardware to create a computer system or computer sub-system embodying aspects of the present invention.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. An optical edge break gage for 3D surface profile measuring, comprising:
   a projector comprising a light source and projection optics that guide light from the light source along a projection light path;
   an optical grating device in the projection light path that modifies the projection light path to project a structured light pattern onto a surface being profiled;
   a viewer attached to the projector, comprising viewing optics with a viewing light path that is non-parallel to the projection light path, a light sensing array in the viewing light path for sensing an image of diffuse reflection of the structured light pattern from the surface, and a digitizer connected to the light sensing array for digitizing the image, wherein the viewing optics comprises a telecentric lens system; and
   a computer comprising data input communication with the digitizer and a processor for modeling the surface being profiled based on surface contour information provided by the digitized reflected image, wherein the projection and viewing light paths approximately intersect each other within a common field of view of the projector and viewer, and further comprising a guide tip attached to a hand-held unit comprising a combination of the projector and the attached viewer, the guide tip extending beside the projection light path and beside the viewing light path to an end point in the common field of view to position and steady the edge break gage relative to the surface being profiled during a snapshot period of time.

2. An edge break gage as in claim 1, wherein the projection optics comprises a telecentric lens system.

3. An edge break gage as in claim 2, wherein the optical grating device is mounted in the projector at an angle to the projection light path to create a projected image focal plane approximately at the intersection of the projection and viewing light paths and approximately coplanar to a vertex of the edge.

4. An edge break gage as in claim 1, and further comprising:
   a hand grip attached to the hand-held unit for manual positioning of the unit;
   a digital camera circuit electronically connected to the light sensing array and digitizer circuits for collecting a digital image snapshot;
   a trigger button electronically connected to the digital camera circuit for triggering an image snapshot; and
   a computer interface circuit connected to the digital camera circuit for transfer of digital image snapshots to the computer.

5. An edge break gage as in claim 1 wherein the structured light pattern is created by an optical grating mounted in the projector at an angle to the first optical axis to create a projected image plane located approximately coplanar to a vertex of the edge.

6. An optical edge break gage, comprising:
   a projector for projecting a structured light pattern along a first optical axis onto a surface;
   a viewer attached to the projector for receiving a reflection of the structured light pattern from the surface along a second optical axis, and digitizing a two-dimensional snapshot of the reflection when a triggering signal is provided;
   the first and second optical axes being non-parallel, and approximately crossing each other within a common field of view of the projector and the viewer;
   a computer interfaced to the viewer to receive the digitized snapshot;
   a processor in the computer for analyzing the digitized snapshot and mathematically modeling the surface;
   the projector and the attached viewer comprising a hand-held assembly that is freely movable;
   a hand grip on the hand-held assembly with a trigger button for providing the triggering signal; and
   a guide tip on the hand-held assembly, the guide tip extending beside or around the two optical axes to the common field of view to position the hand-held assembly relative to the surface.

* * * * *